United States Patent [19]

Willis

[11] Patent Number: 4,611,426
[45] Date of Patent: Sep. 16, 1986

[54] RODENT BAIT STATION

[76] Inventor: Donald W. Willis, P.O. Box 291, Lompoc, Calif. 93436

[21] Appl. No.: 699,763

[22] Filed: Feb. 8, 1985

[51] Int. Cl.⁴ ............................................. A01M 25/00
[52] U.S. Cl. ........................................ 43/131; 43/124
[58] Field of Search ........................... 43/131, 124, 121

[56] References Cited

U.S. PATENT DOCUMENTS

| | | | |
|---|---|---|---|
| 1,274,123 | 7/1918 | Wigginton | 43/131 |
| 2,568,168 | 9/1951 | Query | 43/131 |
| 4,026,064 | 5/1977 | Baker | 43/131 |
| 4,228,613 | 10/1980 | Kalnasy | 43/131 |
| 4,349,982 | 9/1982 | Sherman | 43/131 |
| 4,400,904 | 8/1983 | Baker | 43/131 |

FOREIGN PATENT DOCUMENTS 2703978  8/1978  Fed. Rep. of Germany ........ 43/131

36-9122  6/1961  Japan ................................. 43/131

Primary Examiner—Nicholas P. Godici
Assistant Examiner—K. Rowan
Attorney, Agent, or Firm—Robert K. Rhea

[57] ABSTRACT

A child and pet safe rodent bait station formed by a rectangular hollow housing having transversely aligned see-through rodent entry openings in its opposing side walls adjacent one end of the housing. An upstanding ridge forming barrier on the housing bottom wall defines a bait compartment in the other end portion of the housing. An upstanding polygonal-shaped wall on the housing bottom, partially intersecting the rodent passageway between the entry openings and disposed medially the width of the housing, cooperates with housing side wall indentations to restrict the passageway between the entry openings and the bait compartment to exclude children and/or pets.

3 Claims, 4 Drawing Figures

RODENT BAIT STATION

BACKGROUND OF THE INVENTION

1. Field of the Invention

The present invention relates to rodent bait stations and more particularly to a poison bait station for ground squirrels, roof rate (rattus rattus alexandrinus) and Norway rats (rattus Norwegieus).

2. Description of the Prior Art

U.S. Pat. No. 4,440,904 discloses a rodent bait station formed by an H-shaped enclosure having an upstanding refillable bait supply tube mounted on the H cross bar. Rodents enter the station through the see-through parallel bars of the H-shape.

This invention is distinctive over this patent and other prior art devices by forming a relatively compact rigid wall hollow housing having a rodent see-through entrance at one end and a bait station at its opposite end in which rodents within the housing may see either of the entrance openings to assure a sense of security by being able to exit the housing. The bait station is easily emptied through a filler opening opposite the bait storage end and yet provides an obstruction spaced inwardly of the entrance openings which prevent children or non-target animals accessing the bait when the station is secured to a supporting surface.

SUMMARY OF THE INVENTION

The bait station is a generally flat-like rectangular housing in overall configuration having a pair of axially aligned circular openings formed by integral short tube members projecting laterally of the housing sides at one end thereof. Baffles or ridges are formed on the bottom wall inner surface to define a bait compartment within its end portion opposite the entrance openings. An upstanding block-like obstruction, formed on the bottom wall medially the housing width and partially intersecting the passageway between the see-through entrance openings, forms an obstruction preventing a child or pet from gaining access to the bait compartment through either of the entrance openings. The end wall of the housing opposite the bait reservoir is provided with a central opening for refilling the bait station with bait.

The principal object of this invention is to provide a self contained tamper resistant refillable rodent bait station having transverse housing baffles normally preventing liquid moisture contact with the bait and which will prevent children and non-target animals gaining access to the bait.

DESCRIPTION OF THE PREFERRED EMBODIMENT

Figure 1:
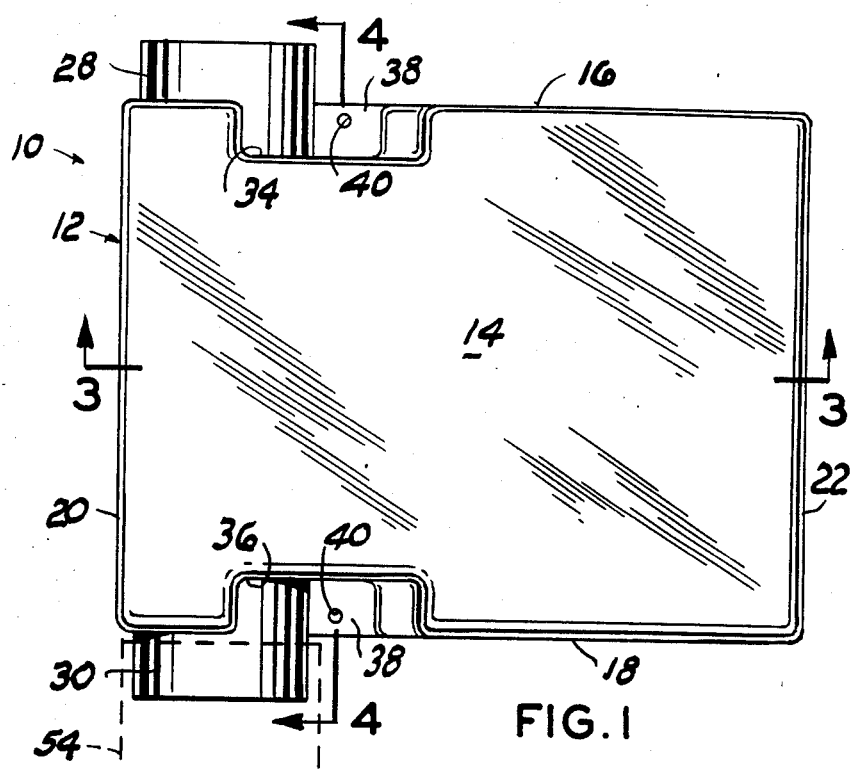
FIG. 1 is a top view of the device.
Figure 2:
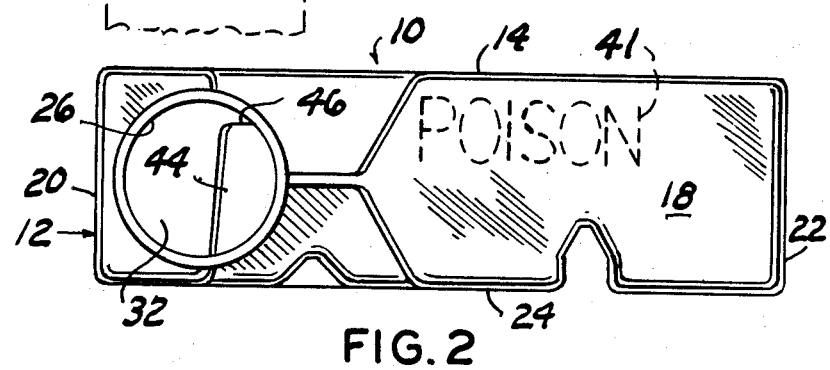
FIG. 2 is a side elevational view of FIG. 1.
Figure 3:
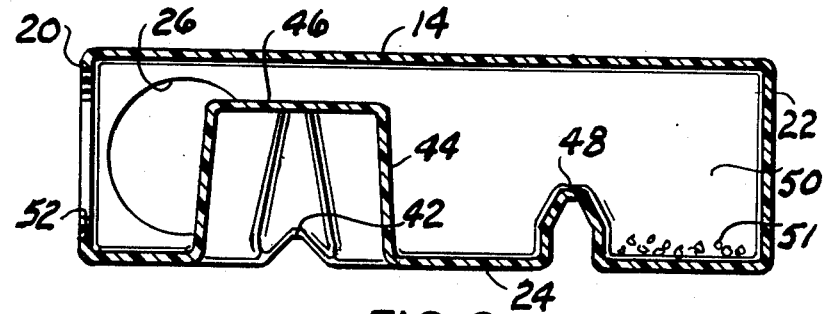
FIGS. 3 and 4 are vertical cross sectional views taken substantially along the lines 3—3 and 4—4, respectively, of FIG. 1.
Figure 4:
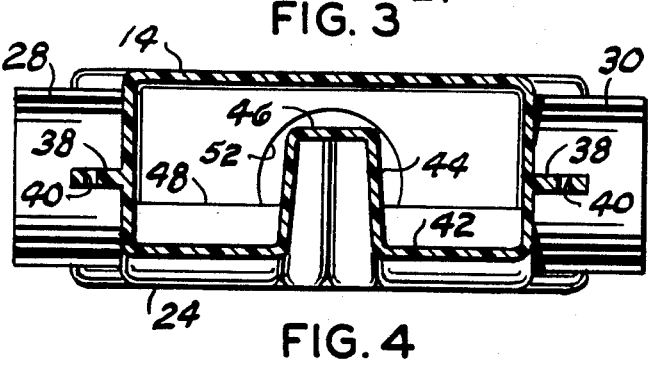

Like characters of reference designate like parts in those figures of the drawings in which they occur.

In the drawings:

The reference numeral 10 indicates the device which is rectangular flat-like in general configuration. The device 10 comprises a one piece hollow housing 12 formed by a horizontal top wall 14 having depending side walls 16-18 and forward and rearward end walls 20 and 22, respectively. The side and end walls are joined to a bottom wall 24 parallel with the top wall 14. Adjacent the front wall 20, the side walls 16 and 18 are respectively provided with a lateral opening 26 characterized by relatively short tubes 28 and 30 projecting laterally of the plane of the respective side wall in horizontally aligned relation thus forming a see-through passageway 32 for rodents, not shown, entering either of the tubes. Adjacent the respective tube 28 and 30 the side walls 16 and 18 are recessed or extended inwardly, as at 34 and 36, rspectively, from the vertical plane defined by the respective side wall. A horizontal web 38 extends between the respective tube and side wall, medially the height of the latter, which is vertically apertured, as at 40, for anchoring the device 10 to a supporting surface. The outer surface of the side walls contain warning indicia 41.

The forward portion of the bottom wall 24 is transversely struck upwardly substantially medially the front to back dimension of the recesses 34 and 36 to form an inverted V-shaped ridge 42. The interior of the housing 12 is further provided with inwardly projecting wall means formed by a downwardly open socket struck up from the bottom wall 24 and forming a generally diamond-shaped, in horizontal section, upstanding obstruction 44 intersecting the transverse forward ridge 42 medially its length with the longer dimension of the diamond-shape extending parallel with the plane of the housing side walls and equidistant on opposing sides of the transverse ridge 42. The upper limit 46 of the obstruction 44 terminates adjacent but spaced downwardly from the housing top wall 14. The purpose of the obstruction 44 is to reduce the spacing between the obstruction and the respective side wall inner surface defined by the recesses 34 and 36 to a dimension normally preventing access by non-target species to the bait compartment as presently described.

The rearward end portion of the housing bottom wall 24 is further provided with barrier means comprising a second transverse indentation or recess forming an inverted generally U-shaped ridge 48 of a selected vertical dimension, for example, approximately two fifths of the inside vertical dimension of the housing to define a rodent bait containing compartment 50 containing bait 51 adjacent the rearward end wall 22. Another purpose of the barrier or ridge 48, in combination with the forward ridge 42, is to normally prevent liquid moisture from entering the bait compartment 50.

The housing forward end wall 20 is centrally provided with an aperture 52 for the purpose of pouring rodent bait 51 into the housing when the housing is disposed on its rearward end 22.

Operation

In operation, the device 10, containing a desired quantity of bait 51, is horizontally disposed in a selected location with its end wall 20 abutting a vertical surface and is suitably anchored in this position, as by nails or pins, not shown, extending through the flange apertures 40. Rodents may then enter either of the tubes 28 and 30 and have access to the bait 51 while non-target animals and children are prevented from reaching the bait by the inwardly directed side wall recesses 34 and 36 in combination with the housing internal obstruction 44.

In high risk non-target species areas other elongated tubes, shown by dotted lines 54 (FIG. 1), may be employed, if desired, to extend the burrow-like feature of the rodent entryways.

Obviously the invention is susceptible to changes or alterations without defeating its practicability. Therefore, I do not wish to be confined to the preferred embodiment shown in the drawings and described herein.

I claim:

1. A tamper-resistant rodent bait station, comprising:
   a one piece hollow housing defined by top and bottom walls joined together by opposing vertical side walls, a front end wall and a rear end wall,
   said side walls each having a rodent entry opening therein disposed adjacent the front end wall in approximately axially aligned passageway forming relation;
   upstanding barrier means inverted U-shaped in transverse section struck in from said bottom wall adjacent but spaced from said rear end wall and cooperating with the side walls for forming a bait compartment in said housing, there being sufficient space between the barrier means and the housing top wall for the entry of a rodent into the bait compartment; and,
   wall means including a downwardly open socket struck in from said bottom wall and forming an upstanding generally diamond-shaped in transverse section wall on said bottom wall projecting into said housing between the entry openings and bait compartment adjacent the passageway and medially the width of the housing for restricting the passageway area between the entry openings.

2. The rodent bait station according to claim 1 in which the side walls are characterized by inwardly directed housing recess forming portion disposed in confronting relation on opposing sides of the wall for reducing the spacing between the inner surface of the side walls and the adjacent surfaces of the diamond-shaped wall.

3. The rodent bait station according to claim 2 and further including:
   a housing anchor web spanning the respective housing recess.

* * * * *